(12) United States Patent
Ma

(10) Patent No.: US 9,081,628 B2
(45) Date of Patent: Jul. 14, 2015

(54) DETECTING POTENTIAL ACCESS ERRORS IN A MULTI-THREADED APPLICATION

(75) Inventor: Zhiqiang Ma, Platteville, WI (US)

(73) Assignee: Intel Corporation, Santa Clara, CA (US)

( * ) Notice: Subject to any disclaimer, the term of this patent is extended or adjusted under 35 U.S.C. 154(b) by 347 days.

(21) Appl. No.: 13/117,526

(22) Filed: May 27, 2011

(65) Prior Publication Data

US 2012/0303910 A1 Nov. 29, 2012

(51) Int. Cl.
*G06F 9/52* (2006.01)
*G06F 11/36* (2006.01)

(52) U.S. Cl.
CPC .............. *G06F 9/52* (2013.01); *G06F 11/3632* (2013.01); *G06F 11/3612* (2013.01)

(58) Field of Classification Search
CPC ......... G06F 9/52; G06F 9/526; G06F 9/3004; G06F 9/30087; G06F 13/1605; G06F 11/3612; G06F 11/3632
USPC ........................................................ 711/150
See application file for complete search history.

(56) References Cited

U.S. PATENT DOCUMENTS

| | | | |
|---|---|---|---|
| 6,701,528 B1 | 3/2004 | Arsenault et al. | |
| 7,228,391 B2 | 6/2007 | Silvera et al. | |
| 7,516,446 B2* | 4/2009 | Choi et al. | ..................... 717/128 |
| 7,539,979 B1 | 5/2009 | Nir-Buchbinder | |
| 7,549,150 B2 | 6/2009 | Yu | |
| 7,673,181 B1 | 3/2010 | Lindo et al. | |
| 7,711,931 B2 | 5/2010 | Kissell | |
| 7,849,297 B2 | 12/2010 | Kissell | |
| 7,861,118 B2 | 12/2010 | Edwards et al. | |
| 2002/0120428 A1* | 8/2002 | Christiaens | ................... 702/186 |
| 2003/0182515 A1 | 9/2003 | Zahir | |
| 2004/0025164 A1 | 2/2004 | Ma et al. | |
| 2005/0010729 A1 | 1/2005 | Silvera et al. | |
| 2005/0038806 A1* | 2/2005 | Ma | ................ 707/102 |
| 2007/0074213 A1 | 3/2007 | Ma et al. | |
| 2007/0266386 A1* | 11/2007 | Kishan et al. | ................. 718/102 |
| 2008/0155342 A1* | 6/2008 | O'Callahan | .................... 714/38 |

(Continued)

FOREIGN PATENT DOCUMENTS

EP 0982658 1/2000

OTHER PUBLICATIONS

International Searching Authority, "Notification of Transmittal of the International Search Report and the Written Opinion of the International Searching Authority," mailed Aug. 29, 2012, in International application No. PCT/US2011/067989.

(Continued)

*Primary Examiner* — Charles Rones
*Assistant Examiner* — Andrew Russell
(74) *Attorney, Agent, or Firm* — Trop, Pruner & Hu, P.C.

(57) ABSTRACT

In one embodiment, a method includes maintaining thread analysis metadata for a multi-threaded application. The metadata may include a thread vector clock for threads of the application and a synchronization vector clock for synchronization objects of the application. In addition, an initialization log and an access log can be generated and maintained for memory accesses occurring during execution of the application. From this metadata, it may be determined if an access to a memory element by a thread is a potential invalid access for a different scheduling of the application. Other embodiments are described and claimed.

20 Claims, 9 Drawing Sheets

(56) References Cited

U.S. PATENT DOCUMENTS

| | | |
|---|---|---|
| 2009/0077540 A1 | 3/2009 | Yuanyuan et al. |
| 2009/0248689 A1* | 10/2009 | Petersen et al. .................. 707/7 |
| 2010/0037025 A1 | 2/2010 | Zheltov et al. |
| 2010/0091984 A1* | 4/2010 | Kerschbaum et al. .......... 380/30 |
| 2010/0131931 A1 | 5/2010 | Musuvathi et al. |
| 2010/0192131 A1 | 7/2010 | Dolby et al. |

OTHER PUBLICATIONS

Yuan Yu, et al., "RaceTrack: Efficient Detection of Data Race Conditions via Adaptive Tracking," (SOSP '05), Oct. 23-26, 2005, 14 pages.

Shan Lu, et al, "AVIO: Detecting Atomicity Violations via Access Interleaving Invariants," 2006, 10 pages.

Leslie Lamport, "Time, Clocks, and the Ordering of Events in a Distributed System," Communications of the ACM, Jul. 1978, vol. 21, No. 7, pp. 558-565.

Min Xu, et al., "A Flight Data Recorder for Enabling Full-System Multiprocessor Deterministic Replay," ISCA 2003, 1063-6897/03 (2003), 6 pages.

Colin J. Fidge, "Timestamps in Message-Passing Systems That Preserve the Partial Ordering," Australian Computer Science Communications, vol. 10, No. 1, pp. 56-66, Feb. 1988.

\* cited by examiner

DETECTING POTENTIAL ACCESS ERRORS IN A MULTI-THREADED APPLICATION

BACKGROUND

As computer technology advances, more systems are implemented as multiprocessor systems including potentially more than one processor or a single processor that includes multiple cores. To take advantage of these advances, software developers can write so-called multi-threaded applications. In these multi-threaded applications, multiple individual threads can be created and used to independently perform units of work to take advantage of the multiprocessor nature of modern computer systems.

While this improves performance and more fully utilizes the resources available in a multiprocessor system, difficulties can arise due to conflicts between the multiple threads. For example, different threads may seek access to the same memory element. Or one thread may seek to use a memory element prior to its initialization by another thread (or after another thread has already deallocated the element). A program may also suffer from potential conflicts in that whether a conflict occurs or not depends on a particular scheduling of the different threads. Thus a conflict can occur according to a certain scheduling of the application, but not others. Because of this uncertainty, available code inspection tools generally cannot determine the presence of potential memory access errors.

DETAILED DESCRIPTION

Figure 1:
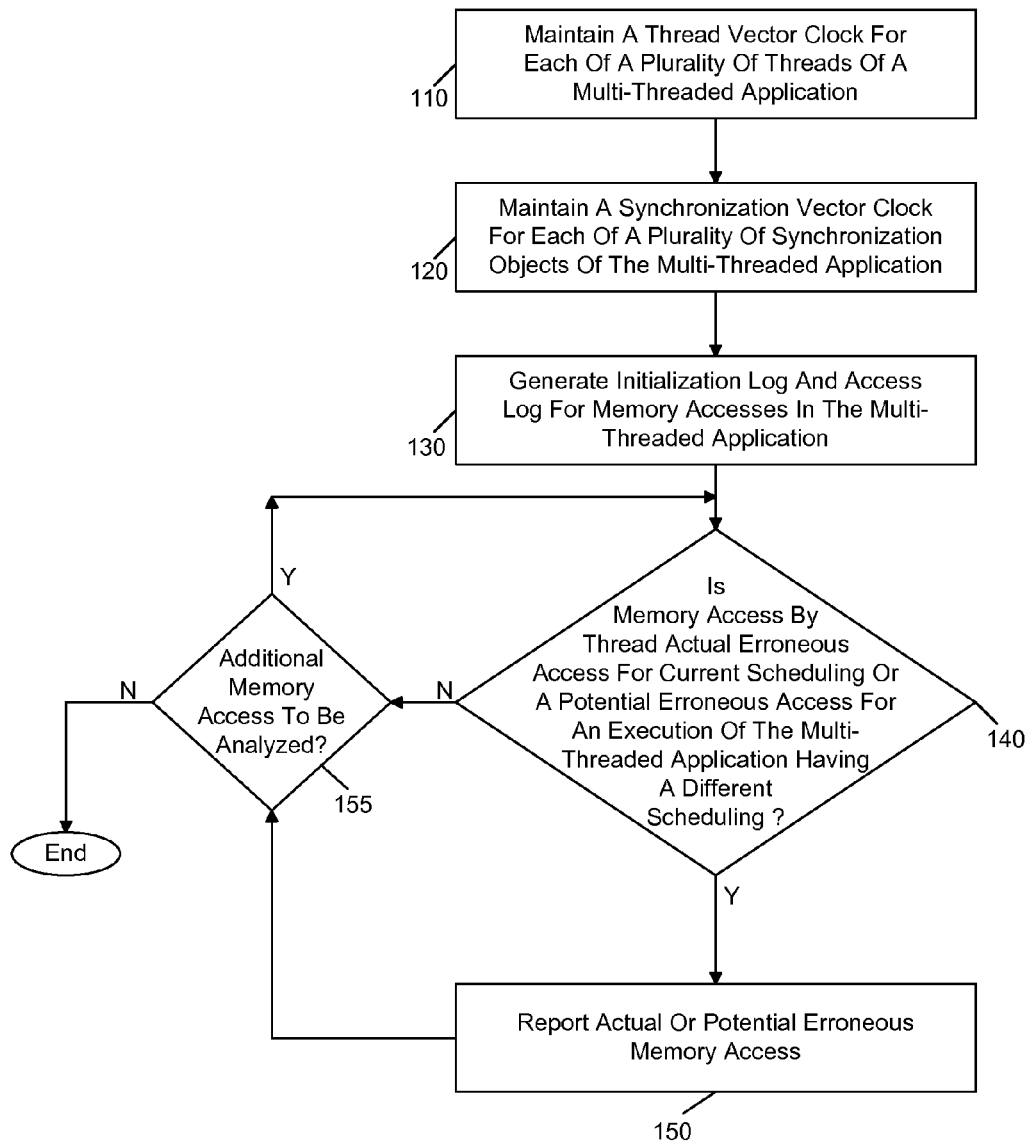
FIG. 1 is a flow diagram of a high-level view of various operations performed in a multi-threaded code analysis tool in accordance with an embodiment of the present invention.

In various embodiments, potential memory access errors, including uninitialized memory access errors and invalid memory access errors in a multi-threaded program can be detected, even if such potential errors do not manifest themselves in a traced execution of the program. Embodiments may monitor execution of a given run of a multi-threaded program (the traced execution) and analyze certain events of interest of the program. In one embodiment, program events that can be monitored and analyzed include thread creations, thread exits, synchronizations, memory allocations and de-allocations (e.g., of heap, stack or static), memory loads and stores. Of course, in other embodiments additional events such as function calls and returns, and so forth may also be monitored.

Consider the following example of code in Table 1 that is possible in a multi-threaded application.

TABLE 1

```
#include <windows.h>
int *p:
DWORD WINAPI work1 (void *arg)
{
    p[0] = 0;
    return 0;
}
DWORD WINAPI work2 (void *arg)
{
    return p[0];
}
int main (int argc, char ** argv)
{
    HANDLE h[2];
    p = (int *) malloc (16);
    h[0] = CreateThread (0, 8*1024, work1, NULL, 0, NULL);
    h[1] = CreateThread (0, 8*1024, work2, NULL, 0, NULL);
    free (p);
    WaitForMultipleObjects (2, h, TRUE, INFINITE);
    Return 0;
}
```

In this code, two threads, work1 and work2, are present, both of which are created by a main thread. The main thread allocates a memory element, the first thread writes to the memory element and the second thread reads from the memory element (and the main thread thereafter deallocates the memory element). There are two potential memory access errors in this example: an invalid access and an uninitialized read. However, depending on the interleavings of the following events as executed according to a given run of the program by an operating system (OS) scheduler, the errors may or may not actually occur.

This example program execution generally includes the following operations:

work1: p[0]=0;
work2: return p[0];
main: free(p).

These events thus initialize a memory element (via a first thread work1), read access the memory element (via a second thread work2), and free the memory element (via the main thread).

There are 6 possible schedules or interleavings, S1-S6:
S1: work1: p[0]=0; work2: return p[0]; main: free(p);
S2: work2: return p[0]; work1: p[0]=0; main: free(p);
S3: work1: p[0]=0; main: free(p); work2: return p[0];
S4: main: free(p); work1: p[0]=0; work2: return p[0];
S5: work2: return p[0]; main: free(p); work1: p[0]=0;
S6: main: free(p); work2: return p[0]; work1: p[0]=0;
The actual errors in each schedule are:
S1: no actual errors occur;
S2: uninitialized read. Work2 reads p[0] before work1 initializes it;
S3: invalid access. Work2 reads p[0] after it is freed;
S4: invalid access. Work1 writes p[0], and work2 reads p[0] after it is freed;
S5: uninitialized read and invalid access. Work2 reads p[0] before it is initialized, and work1 writes p[0] after it is freed;
S6: invalid access and uninitialized read. Work2 reads p[0] and work1 writes p[0] after it is freed, and work2 reads p[0] before it is initialized.

An analysis tool in accordance with an embodiment of the present invention can detect memory access errors even in a program run when the errors do not actually occur (but may occur in future runs). Therefore, this tool can detect the potential uninitialized memory read and invalid access even if the threads are interleaved according to schedule S1 in this example. That is, whether a memory access error is actual or potential depends on the thread scheduling. A potential error in one particular run can be an actual error in different runs and vice versa.

For each thread of the program under analysis, an analysis tool in accordance with an embodiment of the present invention may provide a unique identifier and a vector clock. The thread identifier can be a non-negative number. For example, the number 0 can be used to identify an initial thread, the number 1 for the next initiated thread and so on. In turn, a thread vector clock (TVC) is a vector allocated to a given thread having a plurality of elements. More specifically, each element may be an integer having a value corresponding to a logical timestamp, where each element in the vector corresponds to a thread created in the program under analysis. Thus the total number of elements in the thread vector clock corresponds to the total number of threads ever created in the program. The notation $TVCj=[0, 1, 0, \ldots]$ may be used herein to denote the vector clock of thread j, in which 0 is for thread 0, 1 is for thread 1 and 0 is for thread 2, etc. The notation $TVCj[i]$ is used to refer to the element for thread i in the vector clock of thread j. In one embodiment, each element may store a value corresponding to a logical timestamp for the thread, where each of the values can be independently updated as a result of program execution, as described below. Note that the logical timestamps of a given thread vector clock may not reflect accurate timestamp information for any other thread. That is, as will be described update information may only be passed to a TVC when the corresponding thread is involved in a synchronization operation. Thus, the TVC may be maintained in a non-coherent state with respect to the current logical timestamp for the various threads (present in the corresponding threads' vector clocks), reflecting that the thread has partial knowledge of the event ordering of the other threads.

In addition to various memory accesses, a program under analysis may also create synchronization objects (for example, critical sections, mutual exclusion mechanisms (mutexes) such as a given type of lock, etc.) to enable threads to synchronize with each other. Embodiments may further provide a unique identifier and a synchronization vector clock (SVC) for each synchronization object, similar to the identifier and vector clock described above for the threads. Thus the SVC may similarly include an element for each thread of the program and thus the total number of elements in the synchronization vector clock corresponds to the total number of threads, and each element again may be a logical timestamp for the thread, where the value of each element can be individually updated as a result of program execution, as described below. The notation $(SVC)m=[0, 1, 0, \ldots]$ may be used herein to denote the vector clock for synchronization object m, in which 0 is for thread 0, 1 is for thread 1 and 0 is for thread 2, etc. The notation $SVCm[n]$ may be used herein to refer to the element for thread n in the vector clock of synchronization object m.

Note that in various embodiments there can be two different synchronization instances that can be tracked using an analysis tool: posting synchronization and receiving synchronization. For example, releasing a mutex is a posting synchronization and acquiring a mutex is a receiving synchronization. As will be discussed further below, the vector clock of the synchronization object is used to propagate logical timestamps from the thread performing a posting synchronization to another thread performing a receiving synchronization on the same synchronization object.

With regard to memory accesses, for any memory element at a location or address x in the program, it can be in one of three states at any time: Invalid, Uninitialized or Initialized. The initial state of a memory location is Invalid, then on allocation it is Uninitialized, and next on a first write it is Initialized, and finally the location can be returned to the Invalid state upon freeing. A data structure may be provided to store the state of each memory element. The state is updated and maintained during the execution of the program.

To determine potential (and actual) errors, embodiments may maintain an initialization log and an access log for each memory element x used in the program. When a memory location x is being initialized, an initialization log may be created that includes an identification of the initializing thread and a logical time of the initialization (by reference to the value stored in the element of the initializing thread's vector clock corresponding to the initializing thread at the time of initialization). In one embodiment, a single initialization log may be present, with a separate entry for each memory element. Or in other embodiments, each memory element may have its own initialization log.

When x is accessed during program execution (including at its initialization), an access log may be updated that includes an identification of the accessing thread and a logical time of the access (by reference to the value stored in the element of the accessing thread's vector clock that corresponds to the accessing thread at the time of access). In one embodiment, a single access log may be present, with a separate entry for each memory element. Or in other embodiments, each memory element may have its own access log.

Referring now to FIG. 1, shown is a flow diagram of a high-level view of various operations performed in a multi-threaded code analysis tool in accordance with an embodiment of the present invention. As shown in FIG. 1, method 100 may be performed during a single execution of a multi-threaded application on a system. During this single execution, the tool may determine both actual access violations for the executed scheduling (as determined by an OS scheduler) as well as potential access violations for a different scheduling of the program.

As seen in FIG. 1, method 100 may include maintaining a thread vector clock for each thread of the application (block 110). In addition, a synchronization vector clock can be maintained for each synchronization object of the application (block 120). In addition, for any memory touched during execution of the application, an initialization log and an access log may be generated (block 130). Also, the access log may be updated as the memory element is accessed during execution. Note that while shown with this particular sequence of operations in the embodiment of FIG. 1, understand the scope of the present invention is not limited in this regard. Furthermore, understand that in different embodiments, various manners of maintaining these thread and synchronization vector clocks, as well as generating and updating access and initialization logs can occur. These operations thus described may occur throughout execution of the multi-threaded program. Furthermore, the maintaining of the different clocks may include various operations such as clock propagations, comparisons, updates and so forth, all of which can be iteratively performed responsive to occurrence of certain events during program execution.

Still referring to FIG. 1, for a given memory access, it may be determined whether the access by a given thread is an actual or a potential erroneous access, such as an actual erroneous access for a traced execution, or a potential invalid and/or uninitialized access for another execution of the application having a different schedule (diamond 140). If so, control passes from diamond 140 to block 150, where the actual or potential erroneous access can be reported. Otherwise, with regard to that particular memory access no further action is taken. Control passes from both of diamond 140 and block 150 to diamond 155 where it can be determined if additional memory accesses are to be analyzed. If so, control passes back to diamond 140 as above. Of course understand that the various operations in maintaining, generating and updating the thread vector clocks, synchronization vector clocks, and access and initialization logs can occur. Thus FIG. 1 shows a very high level of operation of an analysis tool, rather than any actual execution of the tool.

Figure 2:
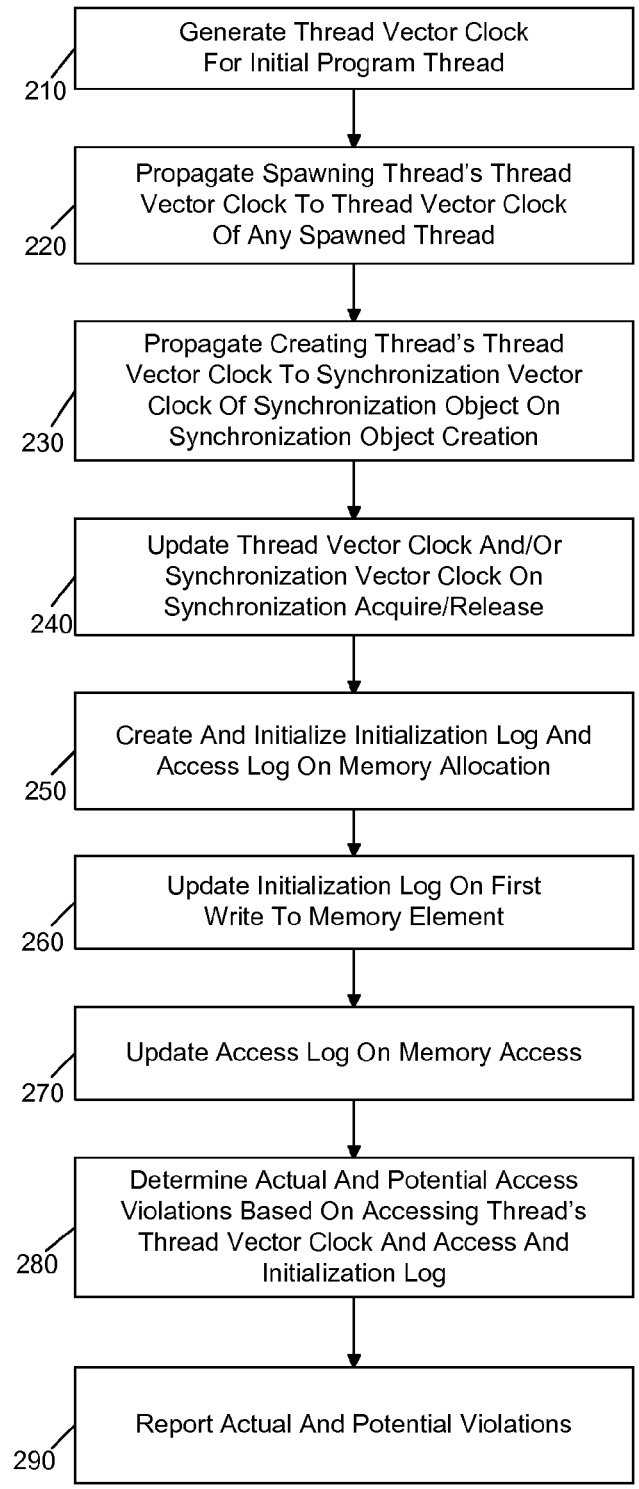
FIG. 2 is a flow diagram illustrating further details of code analysis operations in accordance with an embodiment of the present invention.

Referring now to FIG. 2, shown is a flow diagram illustrating further details of operations in accordance with an embodiment of the present invention. As shown in FIG. 2, an analysis tool, which can be a parallel code inspection tool, may execute a method 200 to generate and update thread vector clocks, synchronization vector clocks, initialization and access logs in accordance with an embodiment of the present invention. Furthermore, for any memory accesses of the application under analysis it can be determined whether an actual or potential violation exists.

As seen in FIG. 2, method 200 may begin by generating a thread vector clock for an initial program thread (block 210). In one embodiment, this thread vector clock may be set at a value of zero for each of the multiple threads of the program. When a thread spawns a new thread, the spawning thread's vector clock may be propagated to the spawned thread (block 220). Note that this propagated thread vector clock may correspond to the value of the spawning thread's vector clock at the time of the new thread's creation. A similar propagation may be performed for creation of any synchronization objects. Accordingly, at block 230 a thread's vector clock may be propagated to create a synchronization vector clock when the thread creates the synchronization object. Note that this propagated synchronization vector clock may correspond to the value of the creating thread's vector clock at the time of the synchronization object's creation.

Still referring to FIG. 2, at block 240 a thread vector clock and/or a synchronization vector clock can be updated on synchronization acquisition and/or release. That is, the vector clocks for both the associated thread and synchronization object can be updated when a synchronization object is posted (released). On a synchronization object receipt (acquiring), only the thread vector clock may be updated. As will be discussed further, in various embodiments different types of updates are possible. Next at block 250, both an initialization log and an access log may be generated and initialized for a memory element on allocation of the memory element. The initialization log and access log can be created and initialized (for example, zeroing out the data structures) on allocation of the memory element. Then on a first write to the memory element, the initialization log may be written (block 260). More specifically, information regarding the initialization thread and initialization time is written to the initialization log at the time of first writing to the memory element by a thread. Then at block 270 an access log may be updated when the memory element is accessed (with the accessing thread identifier and access time).

Note while shown with this linear flow and particular order in the embodiment of FIG. 2, understand the scope of the present invention is not limited in this regard and the various operations described above can be performed generally in any order (although typically the first operation will be generation of a thread vector clock for an initial program thread). Thus these various operations described above can be performed during analysis of program execution according to a given scheduling of the program, e.g., by an OS scheduler. The various information generated and updated, including vector clocks, access logs and initialization logs can be stored in one or more different buffers.

Then at block 280, it can be determined whether actual or potential access violations occur based on information from an accessing thread's vector clock and an access log and initialization log for the memory element to be accessed. If such an actual or potential violation is determined, it may be reported at block 280, e.g., by generating an entry in a report log, which can be stored in a memory or other buffer and/or displayed to a user via a display. Although shown at this high level in the embodiment of FIG. 2, understand that the scope of the present invention is not limited in this regard and in various embodiments, particular operations may be performed in an asynchronous manner, rather than the linear flow shown in FIG. 2.

Referring now collectively to FIGS. 3-7, shown are flow diagrams that illustrate particular operations that can be performed in analyzing a multi-threaded application in accordance with an embodiment of the present invention. More specifically, FIGS. 3-7 illustrate code of an analysis tool that can be used to perform various operations including thread and synchronization vector clock generation and updates, access and initialization log generation and updates, and determination of whether actual or potential memory access violations occur, based on analysis of a single scheduling of a multi-threaded application. Note that although shown with a particular order in the embodiment of FIGS. 3-7, understand the scope of the present invention is not limited in this manner and in different embodiments, the operations performed can occur in a different order.

Figure 3:
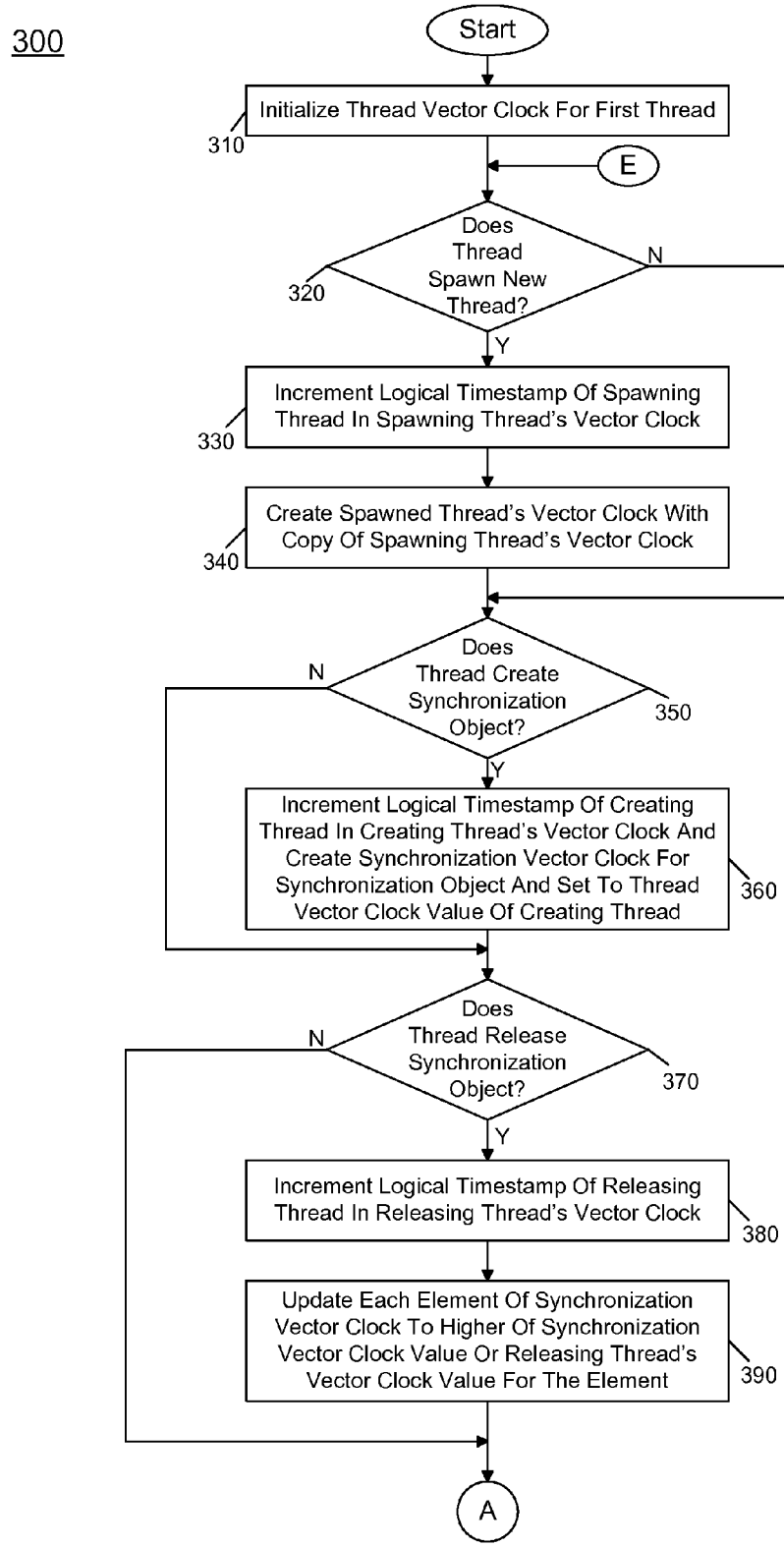
FIGS. 3-7 are flow diagrams that illustrate particular operations that can be performed in analyzing a multi-threaded application in accordance with an embodiment of the present invention.

Referring first to FIG. 3, shown is a portion 300 of a multi-threaded application analysis in accordance with an embodiment of the present invention. The various operations in FIGS. 3-7 may be implemented in code of an analysis tool as it parses execution of a multi-threaded application. As shown in FIG. 3, portion 300 may begin by initializing a thread vector clock for a first thread (block 310). This initial program thread may have its thread vector clock set to an initial value having all elements set at a zero value. Next it may be determined at diamond 320 whether the thread spawns a new thread. If so, control passes to block 330 where the spawning thread's element in its own vector clock may be incremented. In addition at block 340 the spawned thread's vector clock can be created by copying the spawning thread's vector clock to this new thread's vector clock. Thus in this embodiment, a spawning thread's vector clock can be propagated to the spawned thread to initialize its thread vector clock.

Still referring to FIG. 3 at diamond 350 it may be determined whether a thread creates a synchronization object. If so, control passes to block 360 where the creating thread's element in its own vector clock is incremented, and a synchronization vector clock can be created for the synchronization object by copying the creating thread's vector clock. That is, in the embodiment of FIG. 3, another propagation operation can be performed to thus copy the creating thread's vector clock to set the initial state of the synchronization vector clock for the synchronization object.

As seen in FIG. 3, control passes next to diamond 370 where it may be determined whether the thread releases the synchronization object. If so, the thread's vector clock may be updated (block 380). More specifically, the value of the element corresponding to the releasing thread in the thread's vector clock can be incremented. Control next passes to block 390 where each element of the synchronization vector clock can be updated. More specifically, each element can be set to the higher of the synchronization vector clock value (that is, no change is made) or the releasing thread's vector clock value for the corresponding element.

Figure 4:
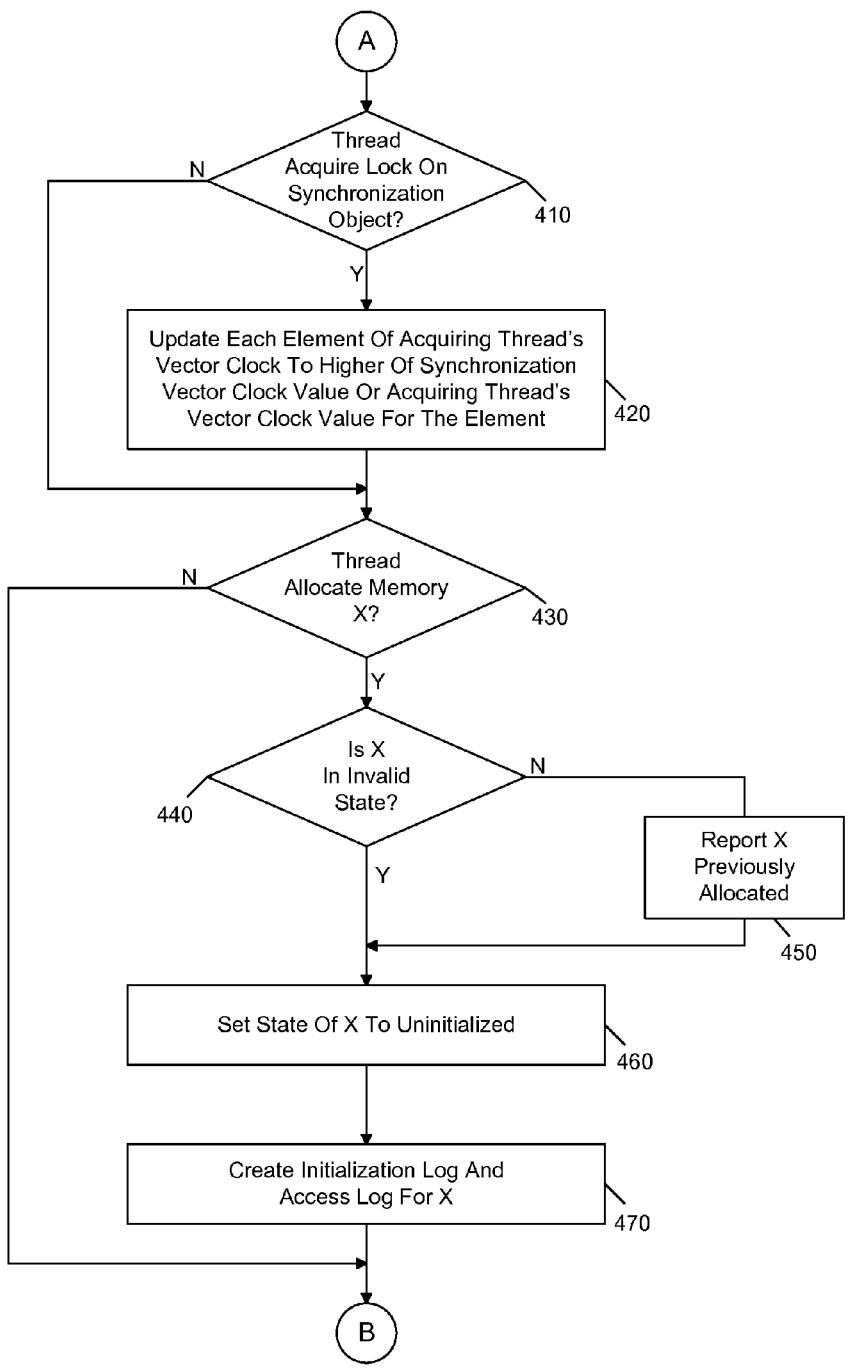

Flow continues to FIG. 4, which is a further portion 400 of multi-threaded application analysis in accordance with an embodiment of the present invention. As shown in FIG. 4, it may be determined at diamond 410 whether a thread acquires a lock on a synchronization object. If so, control passes to block 420 where an update to the accessing thread's vector clock can be performed to thus set the value of each of the vector clock elements to the higher of the synchronization vector clock element value or the acquiring thread's corresponding thread vector clock value for the element.

Control next passes to diamond 430 where it may be determined whether a thread allocates a memory element X. If so, it can be determined whether X is in the invalid state (diamond 440). If not, control passes to block 450 where X may be reported as previously allocated and thus as an actual error. Control passes from both diamond 440 and block 450 to block 460 where the state of X may be set to uninitialized. Control then passes to block 470 where an initialization log and an access log for X can be created. As will be described below, in one embodiment, the initialization log may later be generated on initialization of the memory element by way of storing an entry for the memory element in an initialization log that includes an identifier for the initializing thread and the corresponding value of the element for the thread in the initializing thread's vector clock. The same information may be stored in a corresponding entry of the access log.

Figure 5:
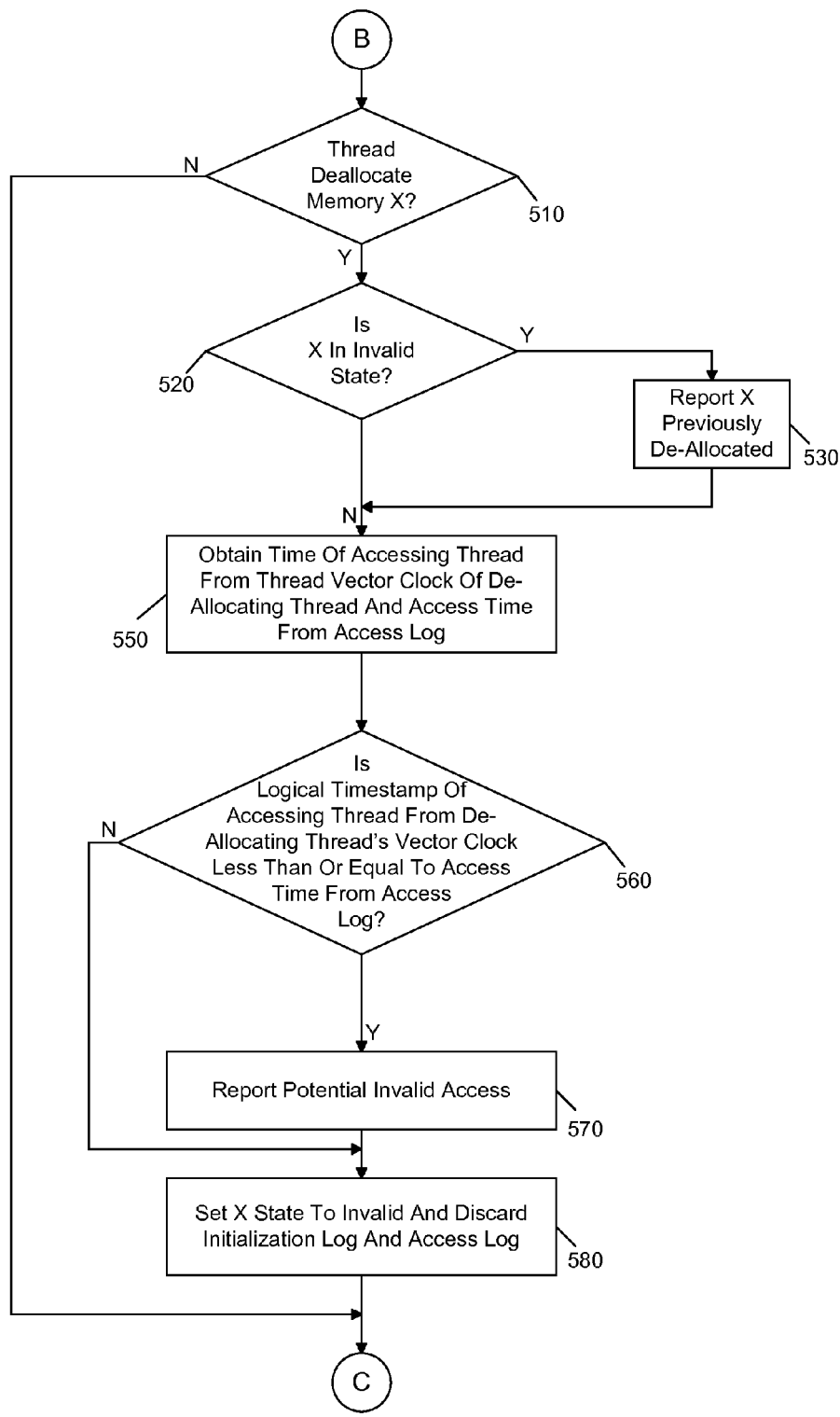

Flow continues to FIG. 5, which is a further portion 500 of multi-threaded application analysis in accordance with an embodiment of the present invention. At diamond 510 it may be determined whether a thread has deallocated memory X. If so, control passes to diamond 520 to determine whether X is already in the invalid state. If yes, control passes to block 530 where X may be reported as previously de-allocated as an actual violation. Next, a series of operations may be performed to determine whether an invalid access potential error exists. Specifically, at block 550 a time of the last accessing thread in the de-allocating thread's vector clock and an access time from the access log (that corresponds to the last access of the memory element) can be obtained. Control then passes to diamond 560, where it may be determined whether the logical timestamp element of the access thread in the de-allocating thread's vector clock is less than or equal to the access time from the access log. If so, a potential invalid access could occur in some scheduling of the application as the last access could potentially occur after the deallocation and accordingly, this potential invalid access can be reported (block 570). The reporting may take different forms; however in some embodiments information regarding this potential invalid access can be stored in an error log. In addition, the information may be provided to, e.g., a user interface such as a graphical user interface to enable a user to view this information. Control passes next to block 580 where X may be set to the invalid state and both the initialization log and the access log can be discarded, e.g., to reduce memory consumption.

Figure 6:
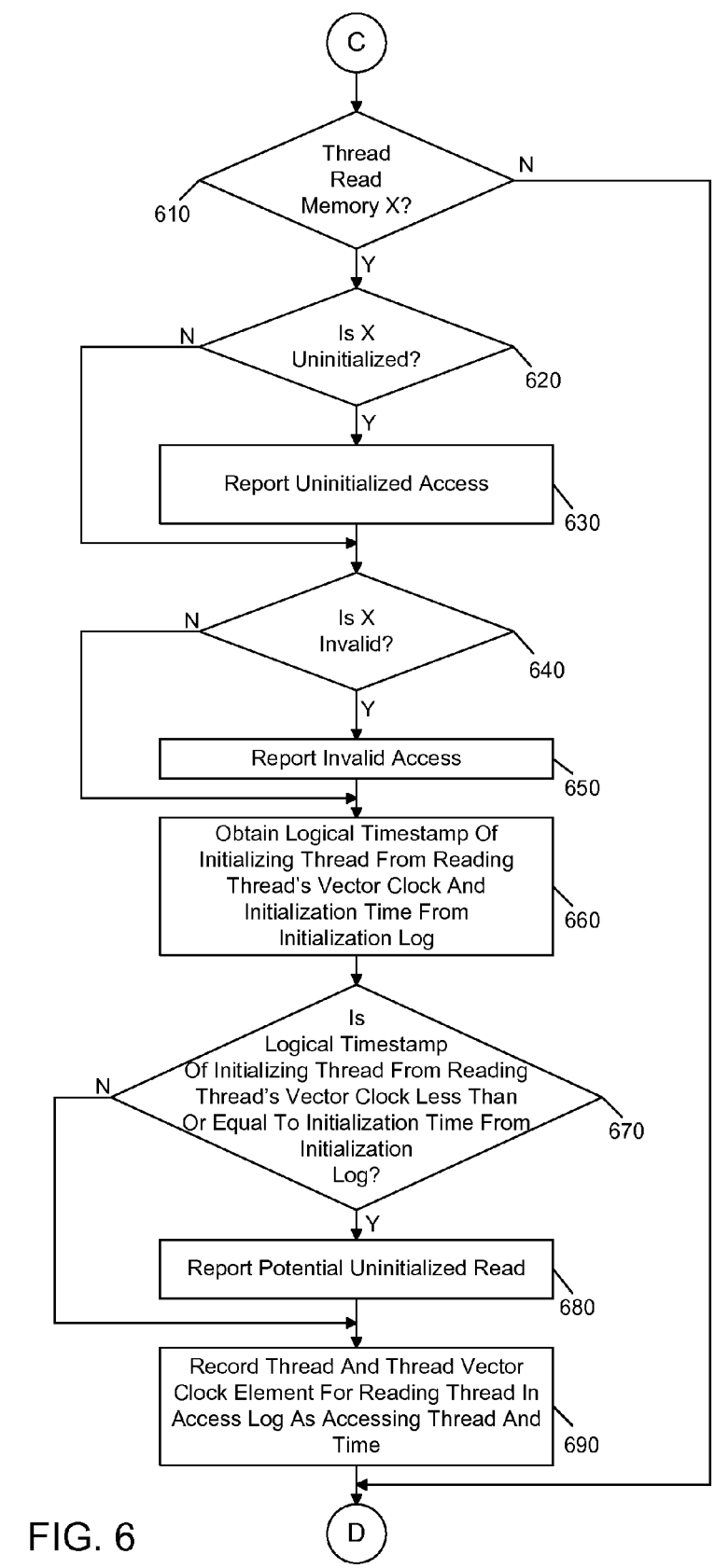

Flow continues to FIG. 6, which is a further portion 600 of multi-threaded application analysis in accordance with an embodiment of the present invention. At diamond 610 it may be determined whether a thread reads a memory element X. If so, control passes to diamond 620 where it may be determined whether X is uninitialized. If so, control passes to block 630 where an uninitialized access may be reported. Then at diamond 640 it may be determined whether X is in an invalid state. If so, an invalid access can be reported (block 650).

Control then passes to block 660 where the initialization thread's time in the reading's thread vector clock and the initialization time from the initialization log can be obtained. Then at diamond 670 using this information, it can be determined whether the logical timestamp of the initializing thread is less than or equal to the initialization time from the initialization log. If so, a potential uninitialized read can occur in a certain scheduling of the program and thus at block 680 this potential uninitialized read can be reported. Control then passes to block 690, where the thread and the thread vector clock element for the reading access thread can be recorded in the access log for memory element X to thus indicate the accessing thread and time.

Figure 7:
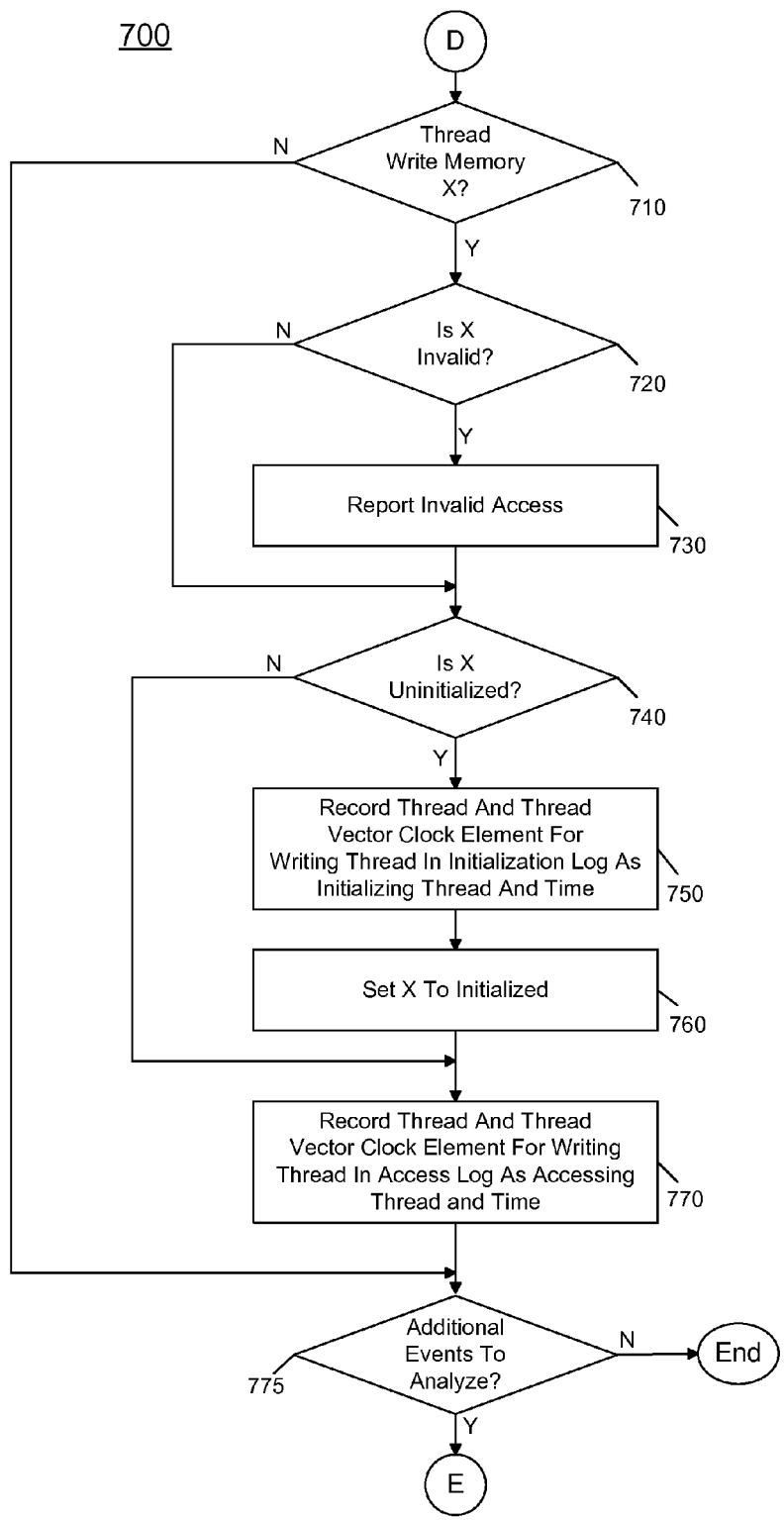

Flow continues to FIG. 7, which is a further portion 700 of multi-threaded application analysis in accordance with an embodiment of the present invention. As shown in FIG. 7, portion 700 may begin by determining whether a thread writes to memory element X (diamond 710). If so, control passes to diamond 720 where it may be determined whether X is in the invalid state. If it is, an invalid access may be reported (block 730). Then it may be determined whether X is in an uninitialized state (diamond 740). If so, control passes to block 750 where the thread and the thread vector clock element for the writing thread from its thread vector clock can be recorded in the initialization log as the initializing thread and time.

Control then passes to block 760 where X may be set to an initialized state and then the same information from the thread, namely its identifier and its corresponding thread vector clock element can be recorded in the access log as the accessing thread's and time (block 770). As seen, at this point the various possible events occurring during multi-threaded application execution relevant to an analysis described herein have been handled. Accordingly, control may proceed back to FIG. 3, discussed above if there are still events to analyze (as determined at diamond 775), otherwise the method can come to an end. Although shown with these particular operations in the order shown in FIGS. 3-7, understand the scope of the present invention is not limited in this manner and different scheduling and occurrence of these operations can be performed in other embodiments. Furthermore, understand that the determinations can be performed after execution of the application itself, as embodiments may buffer the thread vector clock information, synchronization vector clock information and the initialization and access logs such that the analysis can be performed after execution of the application is completed.

Table 2 below shows example pseudo code of a memory checking algorithm to detect potential uninitialized memory accesses or invalid memory access errors in accordance with an embodiment of the present invention.

TABLE 2

```
While (the program is not finished) {
    On (thread T creates thread T') {
        for (each thread K) {
            if (K == T)
                TVC_T[K] = TVC_T[K] + 1;
        }
        create TVC_T' = [0, 0, 0, ...];
        TVC_T' = TVC_T;
    }
    On (thread T creates a synchronization object M) {
        for (each thread K) {
            if (K == T)
                TVC_T[K] = TVC_T[K] + 1;
        }
```

TABLE 2-continued

```
        }
        create SVC_M = [0, 0, 0, ...];
        SVC_M = TVC_T;
    }
    On (thread T performs a posting synchronization on
synchronization object M) {
        for (each thread K) {
            if (K == T)
                TVC_T[K] = TVC_T[K] + 1;
        }
        for (each thread K) {
            SVC_M[K] = max(SVC_M[K] , TVC_T[K]);
        }
    }
    On (thread T performs a receiving synchronization on
synchronization object M) {
        for (each thread K) {
            TVC_T[K] = max(SVC_M[K] , TVC_T[K] );
        }
    }
    On (thread T allocates memory X) {
        if (X is not Invalid)
            report X already allocated;
        set state of X to Uninitialized;
        initialize the initialization log and access log for X;
    }
    On (thread T de-allocates memory X) {
        If (X is Invalid)
            report de-allocating already de-allocated memory;
        get accessing thread T_access and time of access t_access recorded in
the access log if the access log exists;
        if (TVC_T [T_access] <= t_access)
            report potential invalid access;
        set state of X to Invalid;
        discard the initialization log and access log of X;
    }
    On (thread T reads memory X) {
        if (X is Uninitialized)
            report uninitialized access;
        if (X is Invalid)
            report invalid access;
        get the initializing thread T_init and the time of initialization t_init
recorded in the initialization log;
        if (TVC_T (T_init) <= t_init)
            report potential uninitialized read
        record T and TVC_T [T] as accessing thread and accessing time
respectively in the access log;
    }
    On (thread T writes memory X) {
        if (X is Invalid)
            report invalid access;
        if (X is Uninitialized) {
            record T and TVC_T [T] as initializing thread and
initialization time respectively in the initialization log;
            set state of X to Initialized;
        }
        record T and TVC_T [T] as accessing thread and accessing time
respectively in the access log;
    }
}
```

Note that the various vector clocks, initialization logs and access logs can be stored in different locations within a system. For example, various buffers such as present in cache memories of a processor, system memory or so forth can be used to store information generated during execution of an analysis tool in accordance with an embodiment of the present invention. Understand however that the actual form of the buffers or other storage facilities can vary.

Figure 8:
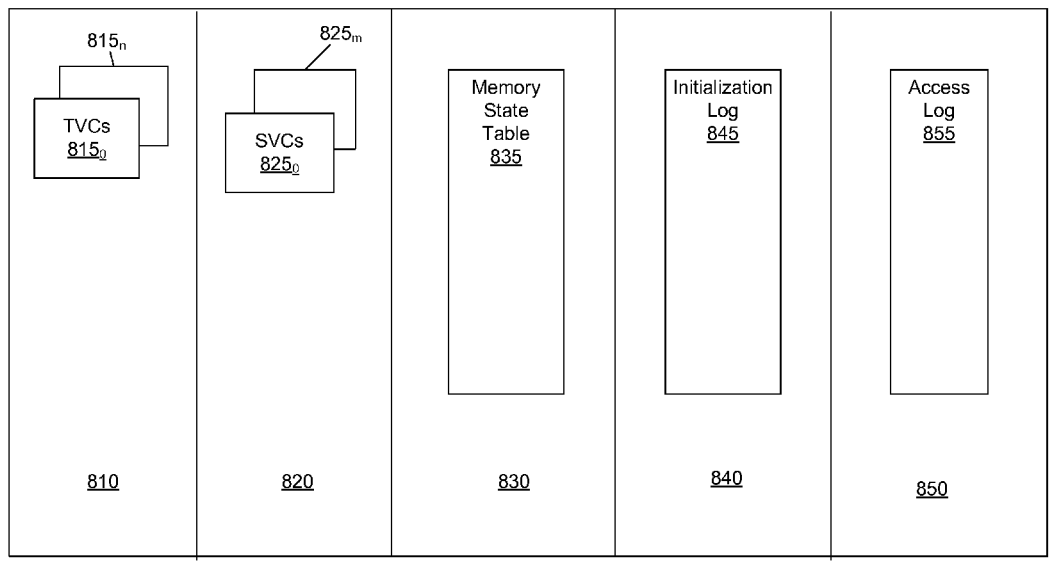
FIG. 8 is a block diagram of a storage unit in accordance with one embodiment of the present invention.

As one example of a storage mechanism for data generated, updated and analyzed using an analysis tool, FIG. 8 shows a block diagram of a storage unit 800. As seen in FIG. 8, storage unit 800, which may be implemented in cache memory, system memory or so forth, includes various partitions including a thread vector clock partition 810, a synchronization vector clock partition 820, a memory state partition 830 to store a memory state table 835 (which may include an indication of a given state, e.g., invalid, uninitialized, or initialized, for each memory element), an initialization log partition 840, and an access log partition 850. As seen in thread vector clock partition 810, a plurality of thread vector clocks $815_0$-$815_n$ may be present. Similarly, in synchronization vector clock partition 820, a plurality of synchronization vector clocks $825_0$-$825_m$ may be present. In the embodiment shown in FIG. 8, initialization partition 840 may include an initialization log 845, which may include multiple entries, each to store initialization data for initialization of a memory element. For example, each entry may store an identifier of the initializing thread and its logical timestamp, obtained from its thread vector clock at the time of initialization. Also in the embodiment shown in FIG. 8, access partition 850 may include an access log 855, which in one embodiment may include a plurality of entries each associated with a particular memory element.

To conserve space in this partition, in one embodiment only information of the most recent access to a memory element may be stored in the corresponding entry. Thus in this embodiment, on a second access to a memory element, the newly accessing thread's information may overwrite the information stored in the corresponding entry. The information stored in each entry may correspond to, in one embodiment, an identifier for the accessing thread and its logical timestamp, obtained from its thread vector clock at the time of access. However in other embodiments, e.g., where space is not a consideration understand that multiple access log entries can be associated with each memory element, where each entry stores information for a particular access. Note that as used herein the terms "access log" and "initialization log" may identify all such logs for all memory elements collectively, or can also be used to identify such logs for only a given memory element, and further note that the access log and initialization log are global to all threads. Although shown with this particular implementation in the embodiment of FIG. 8, understand the scope of the present invention is not limited in this regard and additional or different information can be obtained for performing memory access checking in accordance with an embodiment of the present invention.

Embodiments may thus monitor program events and take proper actions based on the event types from the beginning of the program until its completion. From this monitoring and analysis of thread synchronization events, potential event scheduling can be determined, and in turn the initialization and access logs can be used to detect potential errors.

Embodiments may further process memory read/write events in an asynchronous manner or in a batch mode for performance, as the algorithm does not depend on actual thread interleavings. For example, memory read/write events of a thread can be buffered in a thread private buffer when the events are observed and later processed in a chunk when the buffer is full (or at another selected time) for better cache utilization and performance. Thus embodiments may analyze a single program run and detect potential uninitialized memory access or invalid memory access errors for differently scheduled runs of the program.

Embodiments may thus provide the functionality and ability to detect potential uninitialized memory read and invalid memory access errors in a multi-threaded program, which can be implemented within a memory checking tool. With this functionality, a parallel inspection tool can find hidden bugs in code which may only be triggered in an end user's environment after the code is shipped. In this way, improved reliability of parallel programs can be realized.

Figure 9:
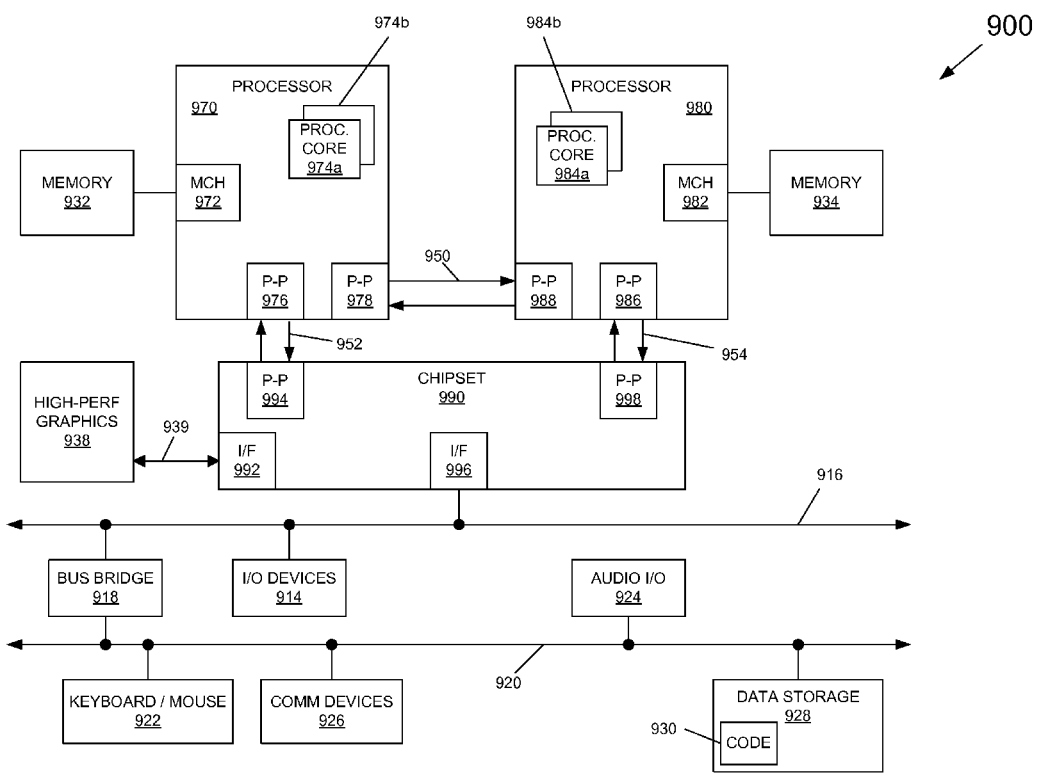
FIG. 9 is a block diagram of a system in accordance with an embodiment of the present invention.

Embodiments may be implemented in many different system types. Referring now to FIG. 9, shown is a block diagram of a system in accordance with an embodiment of the present invention. As shown in FIG. 9, multiprocessor system 900 is a point-to-point interconnect system, and includes a first processor 970 and a second processor 980 coupled via a point-to-point interconnect 950. As shown in FIG. 9, each of processors 970 and 980 may be multicore processors, including first and second processor cores (i.e., processor cores 974a and 974b and processor cores 984a and 984b), although potentially many more cores may be present in the processors. Each of the cores may include various caches having buffers to store the various thread analysis metadata as described above.

Still referring to FIG. 9, first processor 970 further includes a memory controller hub (MCH) 972 and point-to-point (P-P) interfaces 976 and 978. Similarly, second processor 980 includes a MCH 982 and P-P interfaces 986 and 988. As shown in FIG. 9, MCH's 972 and 982 couple the processors to respective memories, namely a memory 932 and a memory 934, which may be portions of main memory (e.g., a dynamic random access memory (DRAM)) locally attached to the respective processors. First processor 970 and second processor 980 may be coupled to a chipset 990 via P-P interconnects 952 and 954, respectively. As shown in FIG. 9, chipset 990 includes P-P interfaces 994 and 998.

Furthermore, chipset 990 includes an interface 992 to couple chipset 990 with a high performance graphics engine 938, by a P-P interconnect 939. In turn, chipset 990 may be coupled to a first bus 916 via an interface 996. As shown in FIG. 9, various input/output (I/O) devices 914 may be coupled to first bus 916, along with a bus bridge 918 which couples first bus 916 to a second bus 920. Various devices may be coupled to second bus 920 including, for example, a keyboard/mouse 922, communication devices 926 and a data storage unit 928 such as a disk drive or other mass storage device which may include code 930, e.g., to perform memory checking analysis of multi-threaded code in accordance with an embodiment of the present invention. Further, an audio I/O 924 may be coupled to second bus 920.

Embodiments may be implemented in code and may be stored on a storage medium having stored thereon instructions which can be used to program a system to perform the instructions. The storage medium may include, but is not limited to, any type of non-transitory storage medium such as a disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   maintaining a thread vector clock in a first storage of a processing system for a first thread of a plurality of threads of a multi-threaded application executing on the processing system;
   maintaining a synchronization vector clock in a second storage of the processing system for each synchronization object of a plurality of synchronization objects of the multi-threaded application;
   generating an access log for memory accesses occurring during execution of the multi-threaded application;
   during execution of a current thread scheduling of the multi-threaded application:
      in response to the first thread de-allocating a first memory element:
         obtaining a timestamp of the first thread from the thread vector clock for the first thread, wherein the first thread vector clock includes a number of elements equal to a total number of threads created by the multi-threaded application;
         obtaining an access time associated with the first memory element from the access log; and
         determining, in the processing system, that a future access to the first memory element is a potential invalid access for a different thread scheduling of the multi-threaded application when the timestamp of the first thread from the thread vector clock for the first thread is less than or equal to the access time associated with the first memory element from the access log, wherein the access to the first memory element is a valid access for the current thread scheduling of the multi-threaded application.

2. The method of claim 1, further comprising reporting the potential invalid access.

3. The method of claim 1, further comprising generating a first thread vector clock for an initial thread of the multi-threaded application and propagating the first thread vector clock to a second thread vector clock for a second thread spawned by the initial thread.

4. The method of claim 3, further comprising updating the first thread vector clock and propagating the updated first thread vector clock to generate a first synchronization vector clock when the initial thread creates a first synchronization object.

5. The method of claim 4, further comprising updating the updated first thread vector clock and the first synchronization vector clock when the initial thread releases the first synchronization object.

6. The method of claim 5, further comprising updating the second thread vector clock when the second thread acquires the first synchronization object.

7. The method of claim 6, wherein updating the second thread vector clock comprises propagating information from the first thread vector clock to the second thread vector clock via the first synchronization vector clock.

8. The method of claim 1, further comprising generating the entry of the access log associated with the first memory element responsive to allocation of the first memory element.

9. The method of claim 1, further comprising determining that the future access to the first memory element is a potential uninitialized read based on a comparison of the timestamp of the first thread from the thread vector clock to an initialization time associated with the first memory element from an initialization log.

10. An article comprising a non-transitory machine-accessible storage medium including instructions that when executed cause a system to:
    generate a first thread vector clock for a first thread of a multi-threaded application;
    create a first synchronization vector clock for a first synchronization object when the first thread creates the first synchronization object;
    update the first thread vector clock and the first synchronization vector clock when the first thread releases the first synchronization object;
    create an initialization log entry and an access log entry for a memory element when the memory element is allocated and update the access log entry when the memory element is accessed; and
    during execution of a current thread scheduling of the multi-threaded application:
        in response to the first thread de-allocating the memory element:
            obtain a timestamp of the first thread from the first thread vector clock for the first thread, wherein the first thread vector clock includes a number of elements equal to a total number of threads created by the multi-threaded application;
            obtain an access time associated with the memory element from the access log entry for the memory element; and
            determine that a future access to the memory element is a potential invalid access for a different thread scheduling of the multi-threaded application when the timestamp of the first thread from the first thread vector clock is less than or equal to the access time associated with the first memory element from the access log entry, wherein the access to the memory element is a valid access for the current thread scheduling of the multi-threaded application.

11. The article of claim 10, further comprising instructions that when executed enable the system to create the first synchronization vector clock via propagation of the first thread vector clock.

12. The article of claim 11, further comprising instructions that when executed enable the system to determine if the access is a potential uninitialized read based on a comparison of the initialization log entry to the timestamp of the first thread from the first thread vector clock, wherein the initialization log entry is updated when the memory element is first written.

13. The article of claim 11, further comprising instructions that when executed enable the system to propagate the first thread vector clock to a second thread vector clock for a second thread spawned by the first thread.

14. The article of claim 13, further comprising instructions that when executed enable the system to update the first thread vector clock and the first synchronization vector clock when the first thread releases the first synchronization object.

15. The article of claim 14, further comprising instructions that when executed enable the system to update the second thread vector clock when the second thread acquires the first synchronization object by propagation of information from the first thread vector clock to the second thread vector clock via the first synchronization vector clock.

16. A system comprising:
    a processor to execute a multi-threaded application having a plurality of threads and an analysis tool;
    a storage coupled to the processor to store thread analysis metadata including:
        a plurality of thread vector clocks, each associated with one of the plurality of threads and having a plurality of elements each corresponding to a logical timestamp of a thread of the plurality of threads;
        a plurality of synchronization vector clocks, each associated with a synchronization object of the multi-threaded application and having a plurality of elements each corresponding to a logical timestamp of a thread of the plurality of threads; and
        an access log having a plurality of entries each associated with one of plurality of memory elements of the multi-threaded application to store access information for the plurality of memory elements,
    wherein the analysis tool is to, during execution of a current thread scheduling of the multi-threaded application:
        in response to a first thread of the plurality of threads de-allocating a first memory element of the plurality of memory elements:
            obtain a logical timestamp of the first thread from a first thread vector clock for the first thread, wherein the first thread vector clock includes a number of elements equal to a total number of threads created by the multi-threaded application;
            obtaining an access time associated with the first memory element from the access log; and
            determine that a future access to the first memory element is a potential invalid memory access for a different thread scheduling of the multi-threaded application when the logical timestamp of the first thread from the first thread vector clock for the first thread is less than or equal to the access time associated with the first memory element from the access log, wherein the memory access is a valid access for the current thread scheduling of the multi-threaded application.

17. The system of claim 16, wherein the storage is to further store an initialization log having a plurality of entries each associated with a memory element of the multi-threaded application to store initialization information for the memory element.

18. The system of claim 16, wherein the logical timestamps of the first thread vector clock are maintained in the first thread vector clock non-coherently with regard to at least one other thread vector clock.

19. The system of claim 17, wherein the initialization information for the memory element comprises an identifier of a thread that first wrote to the memory element and a logical timestamp for the initializing thread at an initialization time, the logical timestamp obtained from the thread vector clock of the initializing thread.

20. The system of claim 16, wherein the access information for the memory element comprises an identifier of a thread that accessed the memory element and a logical timestamp for the accessing thread at an access time, the logical timestamp obtained from the thread vector clock of the accessing thread.

* * * * *